Oct. 24, 1939.   R. A. MILLER   2,176,999
PROCESS AND APPARATUS FOR BENDING GLASS SHEETS
Filed April 27, 1937   5 Sheets-Sheet 1
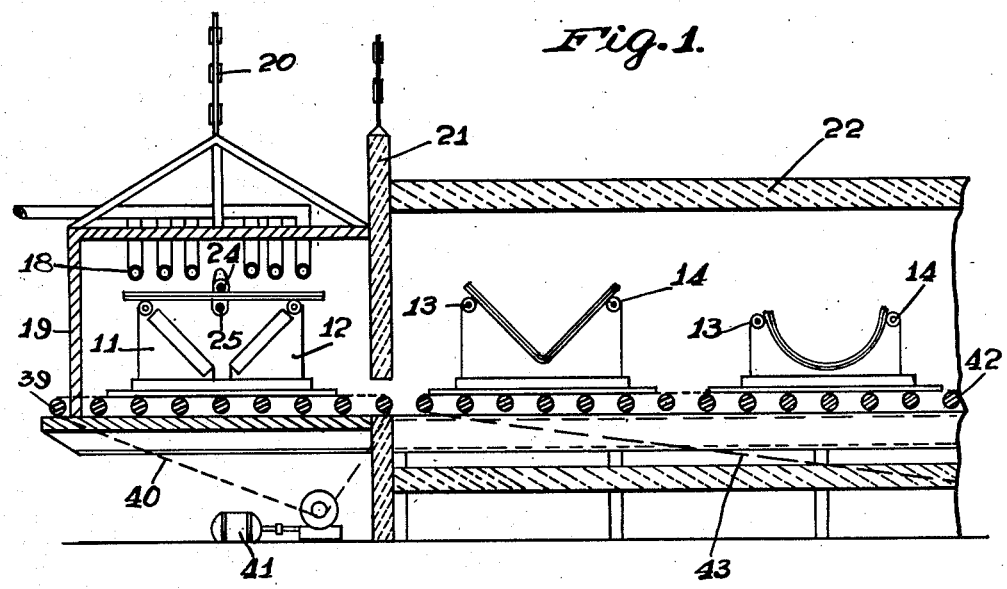
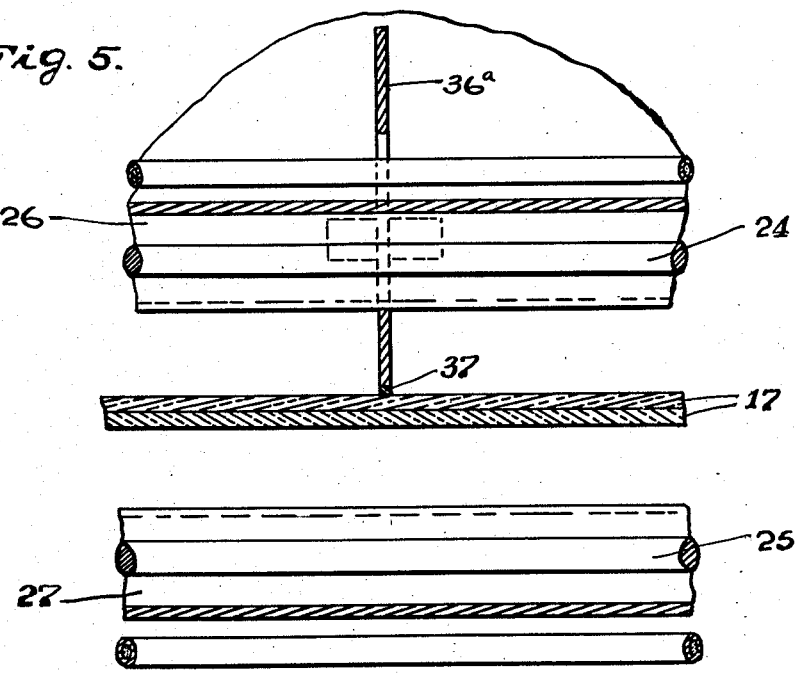
INVENTOR
ROBERT A. MILLER
BY Bradley & Bee
ATTORNEYS.

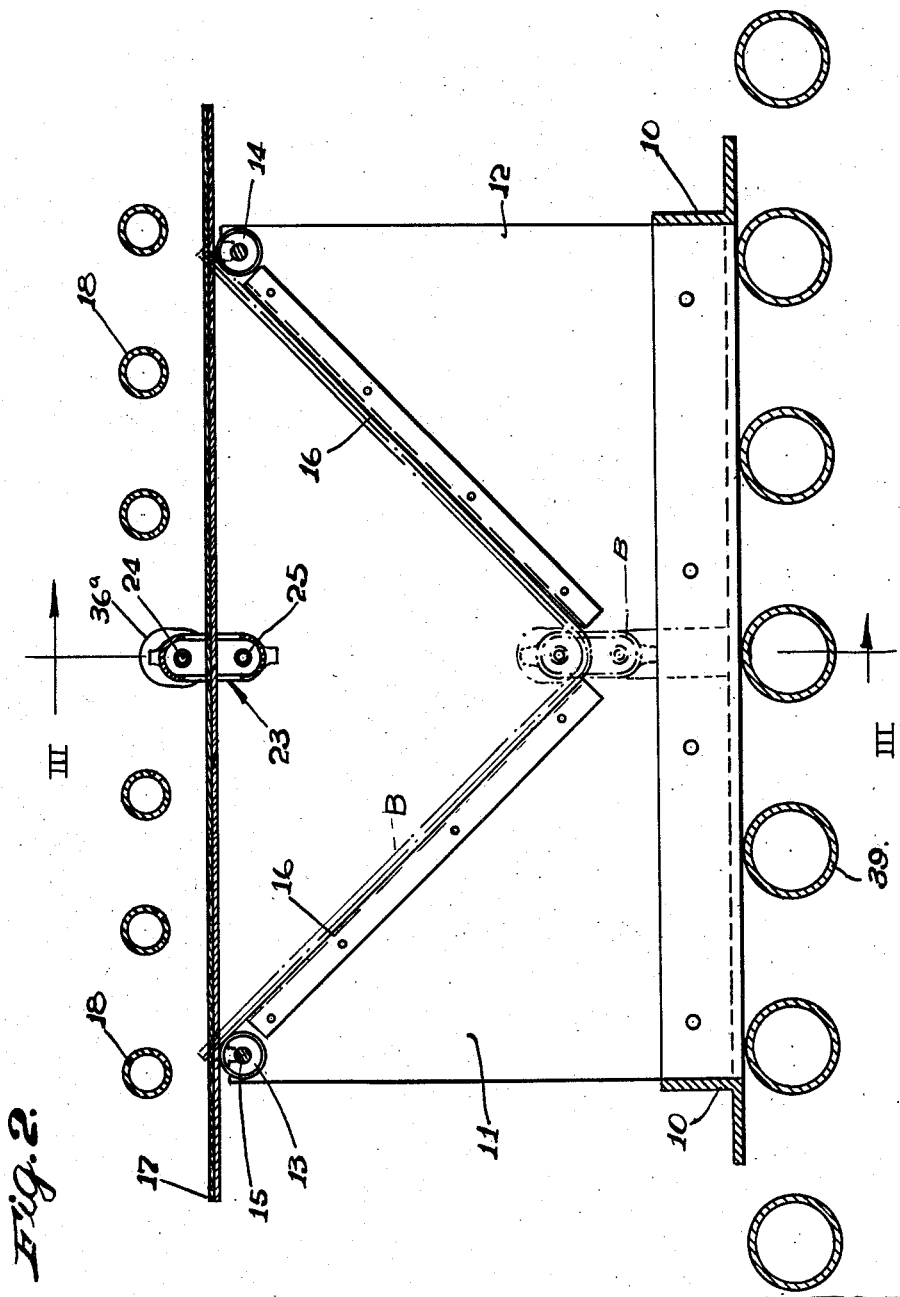

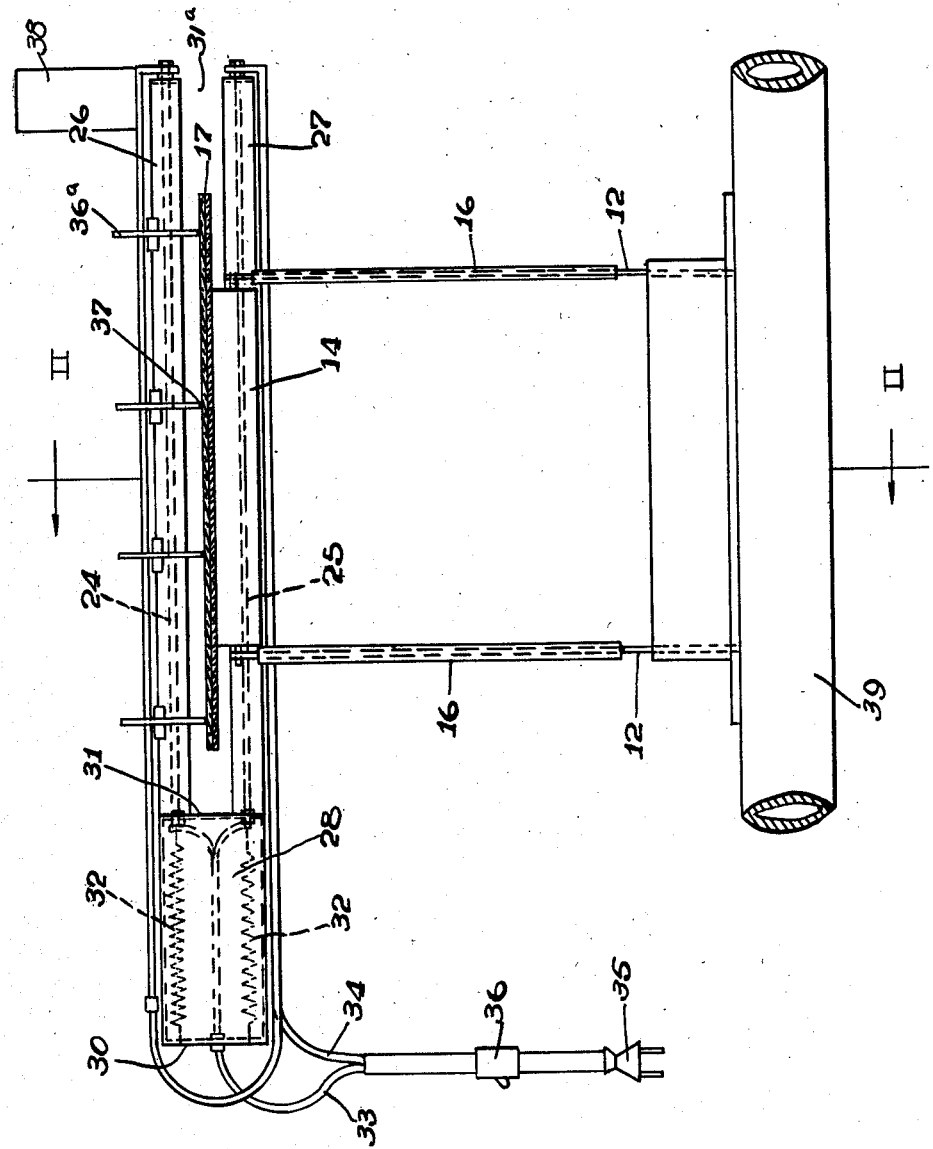

Oct. 24, 1939.  R. A. MILLER  2,176,999
PROCESS AND APPARATUS FOR BENDING GLASS SHEETS
Filed April 27, 1937  5 Sheets-Sheet 4

INVENTOR
ROBERT A. MILLER
BY Bradley & Bee
ATTORNEYS.

Oct. 24, 1939.   R. A. MILLER   2,176,999
PROCESS AND APPARATUS FOR BENDING GLASS SHEETS
Filed April 27, 1937   5 Sheets-Sheet 5

INVENTOR
ROBERT A. MILLER
BY Bradley & Bee
ATTORNEYS.

Patented Oct. 24, 1939

2,176,999

UNITED STATES PATENT OFFICE 2,176,999

PROCESS AND APPARATUS FOR BENDING GLASS SHEETS

Robert A. Miller, Tarentum, Pa., assignor to Pittsburgh Plate Glass Company, Allegheny County, Pa., a corporation of Pennsylvania Application April 27, 1937, Serial No. 139,237

5 Claims. (Cl. 49—7)

Figure 4:
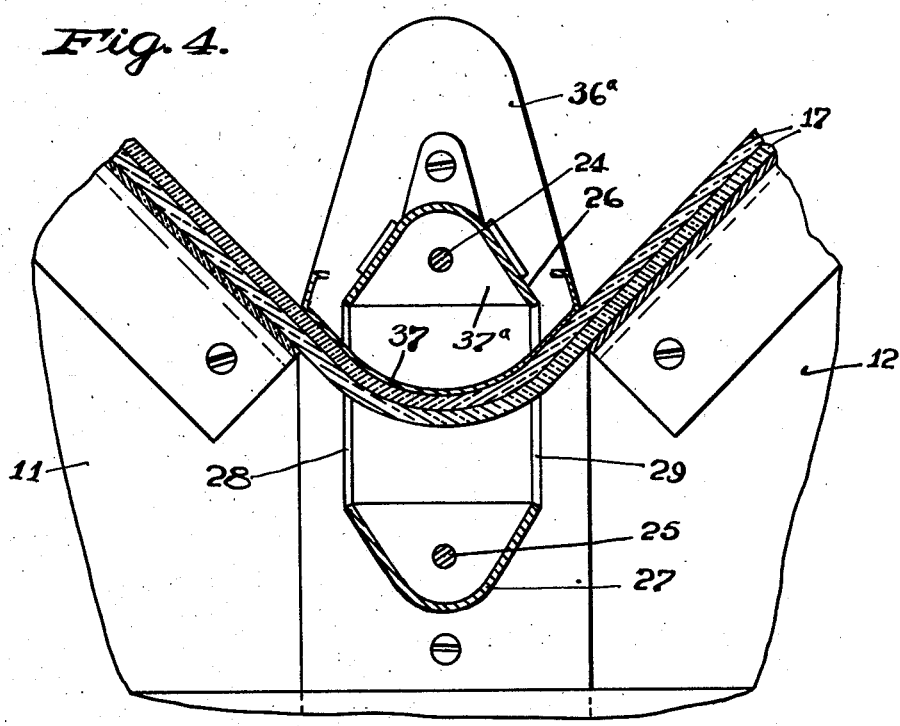
Figure 8:
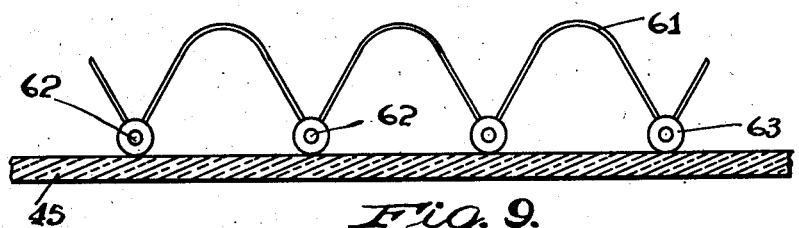
Figure 9:
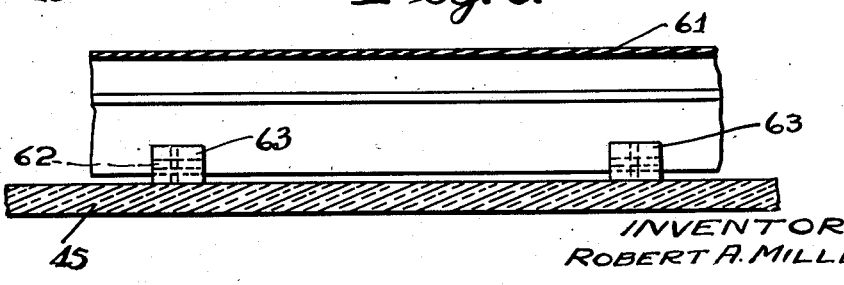
Figure 6:
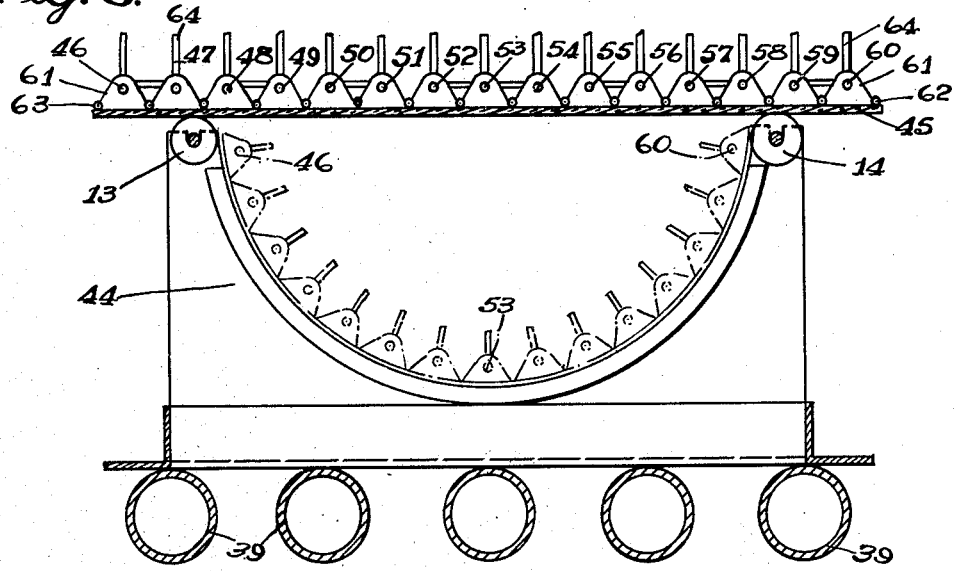
Figure 7:
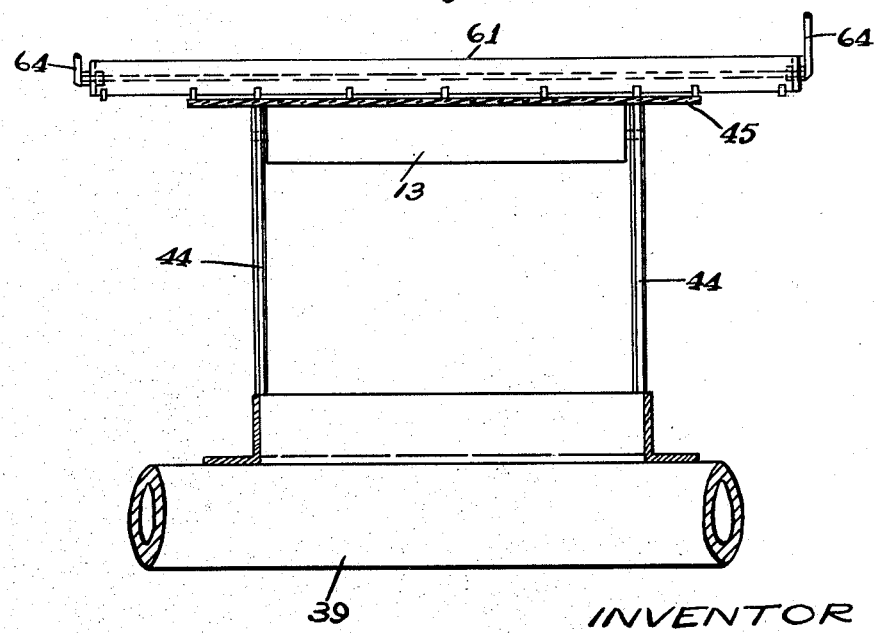

This invention relates to a process and apparatus for bending glass sheets and involves a modification of the process and apparatus of my Patent No. 2,003,383, dated June 4, 1935. The process is particularly adapted for bending sheets in pairs for making safety glass and is so illustrated, but it will be understood that the process and apparatus are equally applicable in the bending of single glass sheets. One object of the present invention is the provision of improved means for making sharp bends in glass sheets to which the procedure of my patent is not so well adapted. A further object is the provision of a process and apparatus which may be used with a much shorter and less expensive leer, due to the localized heating of the glass sheets preliminary to their passage through the leer which in the present case is utilized for annealing only, instead of for both bending and heating as is the case in my patent. A further object of the invention is the provision of a process and apparatus which permits of a more rapid bending of the glass sheets with greater economy and with less danger of marring the glass than in the case of processes heretofore proposed. Certain embodiments of the invention are illustrated in the accompanying drawings, wherein:

Figure 1 is a longitudinal section through the bending device and the roller leer with which it is used. Fig. 2 is a section through the bending device longitudinally thereof on a larger scale than that of Fig. 1, such section being taken on the line II—II of Fig. 3. Fig. 3 is a transverse section on the line III—III of Fig. 2. Figs. 4 and 5 are detail sections through a portion of the bending device, but on a larger scale. Figs. 6 and 7 are sections through a modified form of construction, one of such sections being longitudinal of the apparatus and the other transverse. And Figs. 8 and 9 are enlarged detail sections.

The bending frame as illustrated in Figs. 1 to 5 is designed for making relatively sharp bends. The device is intended to be carried through a roller leer, as indicated in Fig. 1, and comprises a base portion 10 and two pairs of side plates 11 and 12 secured to the base portion and provided with asbestos covered rolls 13 and 14 at their upper ends, such rolls being mounted in suitable pivots 15 and extending from one set of side plates to the other. The pairs of side plates 11 and 12 are preferably covered at their inclined edges with layers of asbestos 16 to reduce the tendency to mar or scratch the glass. In bending the two sheets of glass 17, as indicated in Fig. 2, such sheets are placed one upon the other and supported upon the rollers 13 and 14. Before bending the sheet at its central portion, the glass sheets are brought to a relatively high temperature, which is preferably about 200 degrees below the softening point of the glass, by means of a set of gas burners 18, the purpose in using these gas burners being to avoid any tendency to crack the glass when it is heated locally to the softening point, as later described. In order to make the heating by the burners 18 effective, the device is during the heating operation, protected by a removable hood 19, open on the bottom and on one side and connected to a chain 20 and lifting means so that it can be moved to and from position. During the heating operation, the door 21 at the front end of the roller leer 22 acts as the closure for one side of the chamber provided within the hood 19.

The glass sheets are heated along a narrow band to soften the glass so that the sheets will bend sharply, by means of the device 23, and when the glass is sufficiently softened, it settles by gravity into the triangular space between the pairs of plates 11 and 12, which thus govern the degree of bending. The heating device 23 is supported upon the glass sheets, so that during the heating operation, it moves with the glass sheets and finally arrives at the dotted line position B shown in Fig. 2. The localized heating across the central portion of the sheet to soften the glass so that it will bend by gravity is accomplished by means of a pair of resistance elements 24 and 25 extending in parallel transversely of the glass sheets and with one element above the sheets and the other below, so that the lower sheet may be heated to substantially the same extent as the upper one. If a single sheet were being bent, one heating element might be employed, but even with a single sheet, the use of two elements is preferred, and when two sheets are to be bent, it is essential to use the two heating elements. These elements are of any suitable resistance material, such as nickel, chromium, and their heating effect is accentuated by the use of the reflectors 26 and 27.

The resistance elements are carried by a frame of U shape consisting of the reflectors 26 and 27, the end plate 30, the plate 31, and the side members 28 and 29 extending between plates 30 and 31, the other end of the frame being open, as indicated at 31a, to permit the frame to be positioned over the glass sheet by slipping it thereover from left to right as will be apparent from an inspection of Fig. 3. The resistance wires 24 and 25 are attached to the frame at its right hand end (Fig. 3) and extends slidably at their other ends through the plate 31. Springs 32 attached to the ends of the resistance wires and to the end plate 30 of the frame serve to keep the resistance wires under tension and, therefore, straight under varying temperature conditions. Current is supplied through the resistance wires by means of the connections 33 and 34 which are provided with a plug 35 and also a switch 36 for controlling the flow of current. In order to provide for the support of the frame upon the glass sheets, such frame has secured thereto a series of metal plates 36a lying in vertical planes and provided along their lower edges with narrow strips 37 of asbestos, which engage the surface of the upper glass sheet. These plates have triangular openings 37a (Fig. 4) therethrough so that they fit around the reflector 26 and are adjustable to any desired position along its length. The frame is thus supported upon the glass sheets with the heating elements 24 and 25 in properly spaced position with respect to the glass sheets, and during the heating operation the frame moves downward as the glass sheets bend, the weight of the frame serving to add to the weight of the sheet in securing the bending effect, the sheets thus being caused to bend at a lower temperature than would be the case if no weight were imposed upon the glass. In order that the frame may be properly balanced upon the glass sheets, the right hand end is preferably provided with a counterweight 38, as indicated in Fig. 3.

The step of bringing the temperature of the sheets up to a point below the bending point and then heating the glass locally along a narrow band, so that it will sink down into the form, is carried on in the hood 19 at the left hand end of the leer (Fig. 1) as heretofore pointed out, and after such bending operation, the door or gate 21 of the leer is lifted and the frame carrying the glass sheets in bent condition is moved through the annealing leer 22 where the glass is allowed to cool gradually to a temperature at which it may be handled at the outlet end of the leer. This procedure permits of the use of a much shorter leer than is the case where the glass is brought up to bending temperature in the leer itself, as in my patent heretofore referred to. During the bending operation in the hood 19, the bending frame is supported upon a set of apron rolls 39 which are moved by means of a chain 40 passing around on the ends of the rolls and sprockets operated from an electric motor 41. The leer rolls 42 are operated by a chain 43 passing around sprockets on the ends of the leer rolls and operated by means of an electric motor in the usual way.

Figs. 6 to 9 illustrate a modified type of apparatus designed to make the ordinary type of bend in glass plates as opposed to the sharp type of bend for which the apparatus of Figs. 1 to 5 is particularly designed. In this apparatus, the frame construction is as heretofore described in connection with the sharp bend apparatus, except that the side plates 44 are formed with continuous bends extending from the roller 13 to the roller 14. The method of using the apparatus is the same as heretofore described in connection with the apparatus of Figs. 1 to 5, in that after the bending operation is performed in the hood 19, the frame is carried through the annealing leer. In the apparatus of Figs. 6 to 9, provision is made for heating the glass sheet 45 to a bending temperature throughout its length instead of merely at a narrow band as is the case with the apparatus of Figs. 1 to 5. In order to accomplish this result, a series of parallel heating elements 46 to 60 are employed, all located above the level of the sheets and each provided with a reflector 61 of sheet metal. The series of reflectors are connected together at their edges by hinge pins 62 (Figs. 8 and 9) surrounded by rolls 63 preferably of asbestos which rest upon the surface of the glass. In the use of the device, current is supplied through suitable leads 64 to heat the resistance elements, and when the glass is heated to the softening point, it sinks by gravity downward between the rollers 13 and 14 until its movement is stopped by the edges of the mold plates 44. The series of reflectors is then removed and the frame is carried through the leer 22 to anneal the glass sheets as heretofore explained. The supply of current to the various leads 64 for heating the elements 46 to 60 is graduated so as to produce the most rapid heating and softening of the glass at the center of the sheet, such heat gradually decreasing to the ends thereof as otherwise the glass will not settle into the mold properly. The amount of current may be regulated to give the desired graduated heating or the same amount of current may be supplied to all of the elements and the time period varied so that the central elements are heated somewhat before current is applied to the elements further out.

What I claim is:

1. A process of bending a glass sheet which comprises supporting it at opposite extremities in a horizontal position with the intermediate sheet portion remaining unsupported, heating the entire sheet to high temperature, but below the softening temperature of the glass, applying radiant heat to each face of the intermediate sheet portion along a narrow band only extending across the sheet to heat such band to bending temperature whereby the sheet bends by gravity, and limiting the bending movement of the sheet so as to produce a predetermined contour.

2. An apparatus for bending a glass sheet comprising means for supporting the sheet in a horizontal position from the opposite ends thereof with the remainder of the sheet out of contact with any supporting surface, a heating resistance element extending transversely of the glass sheet in spaced relation thereto to heat said sheet along an intermediate transverse path, a support for the resistance element free to move downward by gravity and adapted to rest upon the sheet whereby the support and resistance element carried thereby will follow movement of the sheet as it bends, means for supplying electric heating current to the resistance element whereby the sheet is heated to bending temperature along the transverse path corresponding substantially to the position of the transverse element, and a form for limiting the bending movement of the sheet.

3. An apparatus for bending a glass sheet comprising means for supporting the sheet in a horizontal position from the opposite ends thereof with the remainder of the sheet out of contact with any supporting surface, a heating resistance element extending transversely of each side of the glass sheet in spaced relation thereto to heat said sheet along intermediate transverse paths, a support for the resistance elements free to move downward by gravity and adapted to rest upon the sheet whereby the support and resistance elements carried thereby will follow a movement of the sheet as it bends, means for supplying electric heating current to the resistance elements whereby the sheet is heated to bending temperature along the transverse elements, and a form for limiting bending movement of the sheet.

4. An apparatus for bending a glass sheet comprising means for supporting the sheet in a horizontal position from the opposite ends thereof with the remainder of the sheet out of contact with any supporting surface, a series of spaced resistance elements extending transversely of the glass sheet in spaced relation thereto to heat said sheet, inter-hinged supports for the resistance elements free to move downward by gravity and adapted to rest upon the sheet whereby the supports and resistance elements carried thereby will follow the contour of the sheet as it bends, means for supplying electric current to the resistance elements whereby the sheet is heated to bending temperature, and a form for limiting bending movement of said sheet.

5. An apparatus for bending a glass sheet comprising means for supporting the sheet in a horizontal position from the opposite ends thereof with the remainder of the sheet out of contact with any supporting surface, a series of spaced resistance elements extending transversely of the glass sheet in spaced relation thereto to heat said sheet, a series of inter-hinged reflectors, one for supporting each resistance element, being free to move downward by gravity and adapted to rest upon the sheet whereby the reflectors and resistance elements carried thereby will follow the contour of the sheet as it bends, means for supplying electric heating current to the resistance elements whereby the sheet is heated to bending temperature, and a form for limiting the bending movement of said sheet.

ROBERT A. MILLER.